United States Patent
Hudson

(10) Patent No.: US 12,203,570 B2
(45) Date of Patent: Jan. 21, 2025

(54) CONDUIT COUPLING DEVICE, SYSTEM, AND METHOD

(71) Applicant: Benjamin Steven Hudson, The Woodlands, TX (US)

(72) Inventor: Benjamin Steven Hudson, The Woodlands, TX (US)

( * ) Notice: Subject to any disclaimer, the term of this patent is extended or adjusted under 35 U.S.C. 154(b) by 0 days.

(21) Appl. No.: 18/148,777

(22) Filed: Dec. 30, 2022

(65) Prior Publication Data

US 2024/0218947 A1 Jul. 4, 2024

(51) Int. Cl.
*F16L 13/10* (2006.01)

(52) U.S. Cl.
CPC ................... *F16L 13/103* (2013.01)

(58) Field of Classification Search
CPC ......... F16L 13/103; F16L 13/10; F16L 47/02; F16L 21/06
USPC .............................................. 285/294.1, 419
See application file for complete search history.

(56) References Cited

U.S. PATENT DOCUMENTS

| | | | | |
|---|---|---|---|---|
| 1,511,723 A * | 10/1924 | Draver | .................... | F16L 25/04 285/322 |
| 2,296,968 A * | 9/1942 | Wirz, Jr. | ................ | F16L 21/06 285/373 |
| 3,826,521 A | 7/1974 | Wilhelmsen | | |
| 4,013,309 A | 3/1977 | Quick | | |
| 4,165,104 A * | 8/1979 | van den Beld | ......... | F16L 47/02 285/294.1 |
| 4,260,181 A * | 4/1981 | Curtin | ..................... | F16L 55/17 156/308.4 |
| 4,699,404 A | 10/1987 | Drevs | | |
| 4,995,647 A * | 2/1991 | Carey | ....................... | F16L 3/04 174/663 |
| 5,015,015 A | 5/1991 | Fetters | | |
| 5,022,685 A * | 6/1991 | Stiskin | .................. | F16L 39/005 285/914 |
| 5,263,748 A | 11/1993 | Carstensen | | |
| 5,358,283 A * | 10/1994 | Silva | ....................... | F16L 21/06 285/915 |
| 5,443,096 A | 8/1995 | King | | |
| 5,624,140 A * | 4/1997 | Allen | ...................... | F16L 47/02 285/123.1 |
| 6,364,372 B1 * | 4/2002 | Marandi | .................. | F16L 21/06 285/367 |
| 6,676,166 B1 | 1/2004 | Wraith et al. | | |
| 7,416,227 B1 * | 8/2008 | Earnest | ............... | F16L 55/1608 285/373 |

(Continued)

*Primary Examiner* — David Bochna
(74) *Attorney, Agent, or Firm* — Dunlap Bennett & Ludwig, PLLC

(57) ABSTRACT

A conduit coupling device is provided for enabling a conduit coupling system and method. The conduit coupling device has two portions, a coupler and a cap, that adhere, respectively, to two separate conduits being coupled together. The coupler has a first tubular end and a second end that provides an arcuate cutout. The coupler provides a glue channel along the arcuate cutout. The inner surfaces of two ends engage outer surfaces of the two separate conduits, respectively. The cap is dimensioned and adapted to adhere to a portion of the outer surface of the second arcuate cutout conduit so as to provide a glue ridge there along. The glue ridge is dimensioned to be slidably received in the glue channel, thereby forming a locked engagement between the first and second conduits.

17 Claims, 5 Drawing Sheets

(56) References Cited

U.S. PATENT DOCUMENTS

| | | | |
|---|---|---|---|
| 7,438,326 B1* | 10/2008 | Meyers | F16L 41/021 |
| | | | 285/133.11 |
| 8,141,698 B2 | 3/2012 | Pietsch | |
| 8,251,139 B2 | 8/2012 | Carstensen | |
| 8,448,995 B2 | 5/2013 | Ward | |
| 8,690,194 B1* | 4/2014 | Smith | F16L 25/01 |
| | | | 285/154.4 |
| 9,086,181 B2* | 7/2015 | Lei | F16L 37/26 |
| 10,100,964 B1 | 10/2018 | Scott | |
| 10,746,332 B1* | 8/2020 | Haines | F16L 13/10 |
| 2006/0284413 A1 | 12/2006 | Barrera | |
| 2011/0127769 A1 | 6/2011 | Medina | |
| 2016/0053923 A1 | 2/2016 | Leggett | |
| 2016/0305583 A1* | 10/2016 | Conrad | F16L 13/103 |
| 2018/0093421 A1* | 4/2018 | Mori | F16L 47/02 |
| 2019/0331267 A1* | 10/2019 | Warren | F16L 21/06 |
| 2022/0057027 A1 | 2/2022 | Diaz-Granados | |
| 2022/0120362 A1 | 4/2022 | Romero | |
| 2024/0077152 A1* | 3/2024 | Acosta | F16L 21/06 |

* cited by examiner

CONDUIT COUPLING DEVICE, SYSTEM, AND METHOD

BACKGROUND OF THE INVENTION

The present invention relates to conduit coupling methods and devices and, more particularly, a coupling device for repairing or modifying tubing, which may be used for drainage, irrigation, plumbing or the like.

Plastic tubing used for drainage, plumbing and irrigation can either be damaged or require modification over the life of the property or asset. To repair or modify the tubing of an existing tubing system requires an extensive process that can be difficult and time consuming. During this process extensive labor and specialized couplings are required to complete the work, which also makes the current solutions time consuming and expensive. These specialized couplings typically incorporate mechanical connectors (metal straps, screws, or other connective components) and flexible materials to enable repairs or changes to existing tubing systems.

Specifically, current devices require additional, extensive digging to excavate an area (the "repair or modification area") surrounding damaged tubing or tubing to be modified. Then, application of current repair systems is cumbersome as they further require additional preparation of the existing piping/tubing. In fact, the specialized replacement/repair couplings currently used are difficult to install once the digging is complete because the user must slide the specialized coupling over the existing pipe (requiring further excavation and cleaning), stretch and/or bend the coupling to move it into position, etc.

In sum, the existing conduit coupling devices and systems do work, but are difficult to install and the repaired tubing is structurally compromised because of the connection mechanism of the specialized replacement couplings, which also makes the current approach expensive.

As can be seen, there is a need for a conduit coupling device that embodies a system and method for repairing and modifying plastic tubing that is cheaper, can be installed with less digging or excavation, and is faster to install than the prior art.

SUMMARY OF THE INVENTION

The preset invention is a new and unique type of conduit repair coupling not currently available in the industry, wherein the coupling device and method it embodies, streamlines the repair or modification process, making the resulting coupling more robust than other couplings on the market, and also installed at a lower cost.

The present invention embodies a plurality of designs that are superior to other couplings on the market for the following reasons:

(a) the present invention is faster to install (i.e., the coupling device provides a coupler with a partially open end, wherein the coupler is glued to both conduits to be joined, and a cap of the coupling device that is glued on top to cover the partially open end). This hybrid coupling design is unique in that half the coupler can be inserted onto the existing tubing directly and glued prior to fixing/gluing the other partial open half, and the other open half of the coupler has an opening that allows for insertion of a new piece of tubing to repair or modify the system. Commonly this allows the new section of conduit to be snapped into place and held by the two open ends of the coupling, which can now be test fit or glued into place. The open side of the coupling also includes a novel cap piece that leverages unique features to enable a strong bond between the coupler and the cap (providing a robust connection between segments of tubing);

(b) the present invention requires less excavation of existing tubing-based systems as an installer can dig a relatively small opening in the ground, and then insert the coupling device onto the exposed pipe with minimal workspace due to the structural and operative nature of said coupler and cap. This reduces the time and cost of the repair or modification.

(c) the present invention embodies a low-cost design compared with the prior art as the present invention, in some embodiments, includes a two-part PVC design which is simple to design, cheap to manufacture, lighter weight—the shipping costs are lower due to lower weight, and just as robust as current designs.

(d) the coupler body is more rigid than other competitor designs and therefore allows for better alignment and leveling of the joined pipe sections.

In one aspect of the present invention, a conduit coupling device includes the following: a coupler having a first end and an opposing second end; the second end defined by an arcuate cutout; and a glue channel provided along a periphery of the arcuate cutout; and a cap having: an arcuate shape approximately coextensive with the arcuate cutout; and a glue ridge provided along a periphery of the arcuate shape, wherein the glue ridge is dimensioned to slidably be received in the glue channel when the arcuate shape occupies the arcuate cutout.

In another aspect of the present invention, the conduit coupling device further includes a slot on each end of the glue channel, wherein the slot provides a cross sectional void downward of the glue channel; a nub on each end of the glue ridge, wherein the nub is dimensioned and adapted to be slidably received in the respective slot when the arcuate shape occupies the arcuate cutout, wherein the glue channel tapers downward; and further including a butt rib disposed along an inner circumference of the coupler between the first and second ends, wherein a first opening defined by the first end has a diameter greater than a diameter of the first end closer to the second end than the first opening, wherein a second opening curvature partially defined by the second end has a radius greater than a radius of the second end closer to the first end than the second opening; and further comprising a cap protrusion disposed along an outer surface of a curved portion of the glue ridge; and a coupler protrusion disposed along an inner surface of the glue channel, wherein when the arcuate shape occupies the arcuate cutout a locked engagement is formed between the cap and coupler protrusions.

In yet another aspect of the present invention, a method of coupling a first and second conduit includes the following: providing the above-mentioned conduit coupling device; adhering the first end to the first conduit; adhering the second end to the second conduit; and sliding the glue ridge into the glue channel; further providing placing an adhesive in the glue channel prior to sliding the glue ridge therein.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a conduit coupling device is provided for enabling a conduit coupling system and method. The conduit coupling device has two portions, a coupler and a cap, that adhere, respectively, to two separate conduits being coupled together. The coupler has a first tubular end and a second end that provides an arcuate cutout. The coupler provides a glue channel along the arcuate cutout. The inner surfaces of two ends engage outer surfaces of the two separate conduits, respectively. The cap is dimensioned and adapted to adhere to a portion of the outer surface of the second conduit so as to provide a glue ridge there along. The glue ridge is dimensioned to be slidably received in the glue channel, thereby forming a locked engagement between the first and second conduits.

Figure 4:
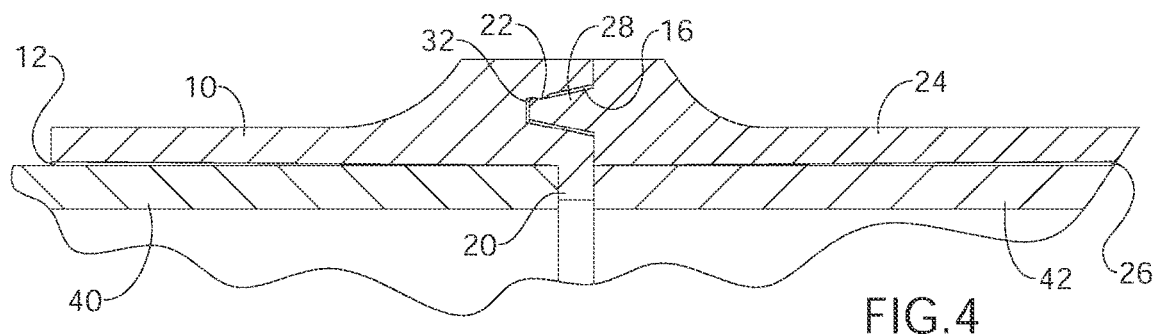
FIG. 4 is a detailed section view of an exemplary embodiment of the present invention, showing the flare opening 12 and 26.
Figure 5:
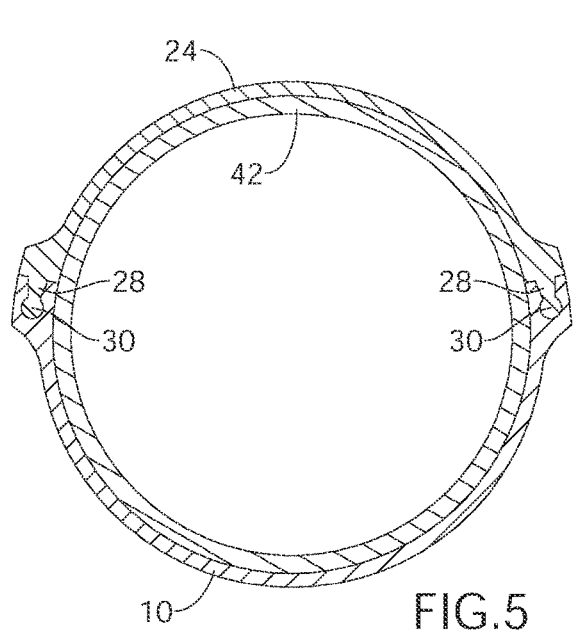
FIG. 5 is a section view of an exemplary embodiment of the present invention, taken along line 5-5 in FIG. 3.
Figure 6:
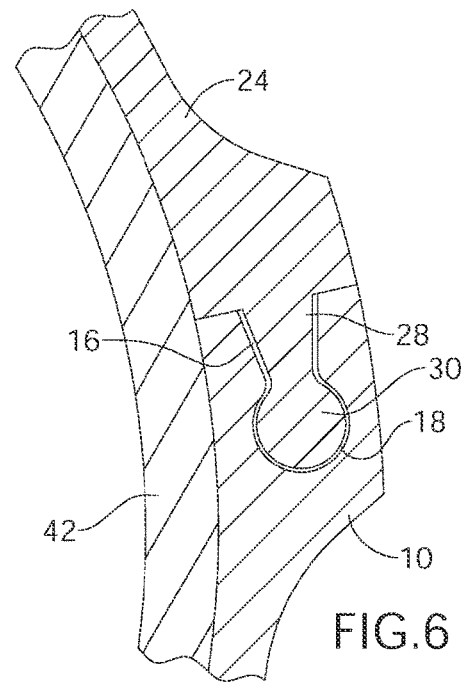
FIG. 6 is a detailed section view of an exemplary embodiment of the present invention, showing the mating of 16 and 18 with 28 and 30.
Figure 7:
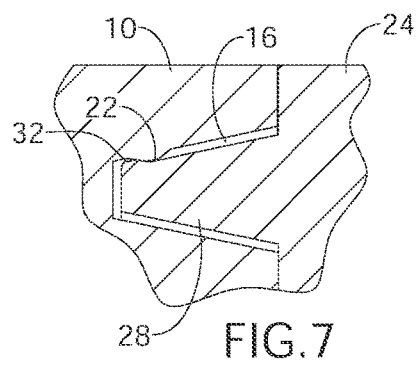
FIG. 7 is a detailed section view of an exemplary embodiment of the present invention, showing ridge 32 being held by channels 16.
Figure 8:
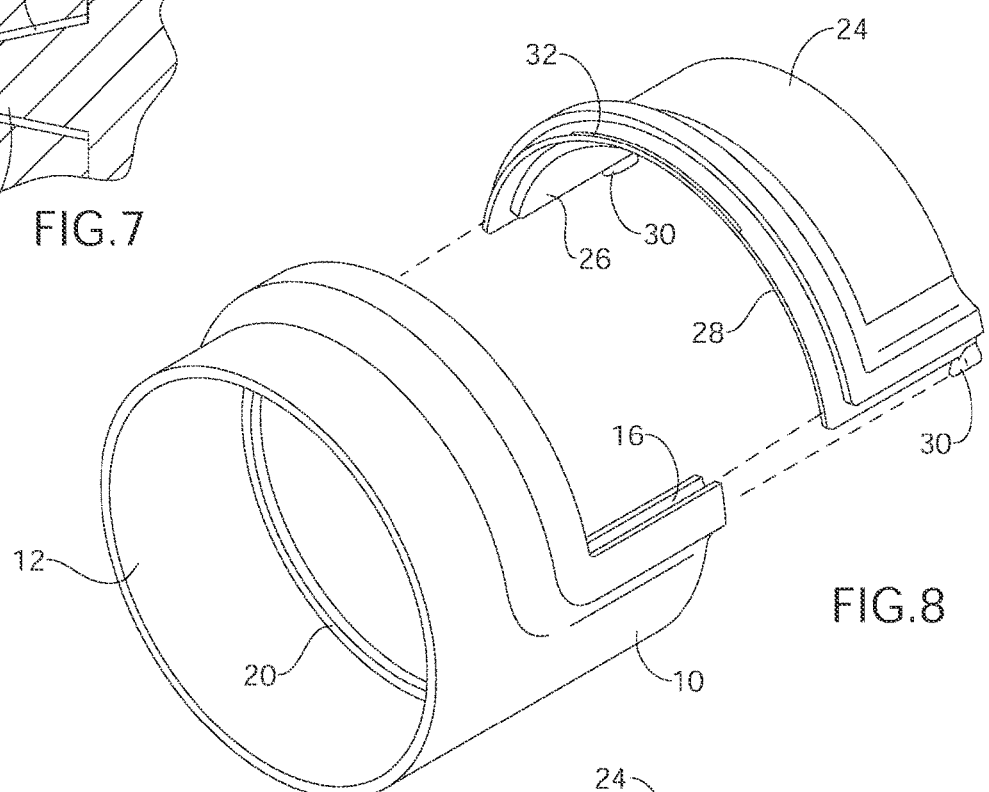
FIG. 8 is a top rear perspective exploded view of an exemplary embodiment of the present invention.
Figure 9:
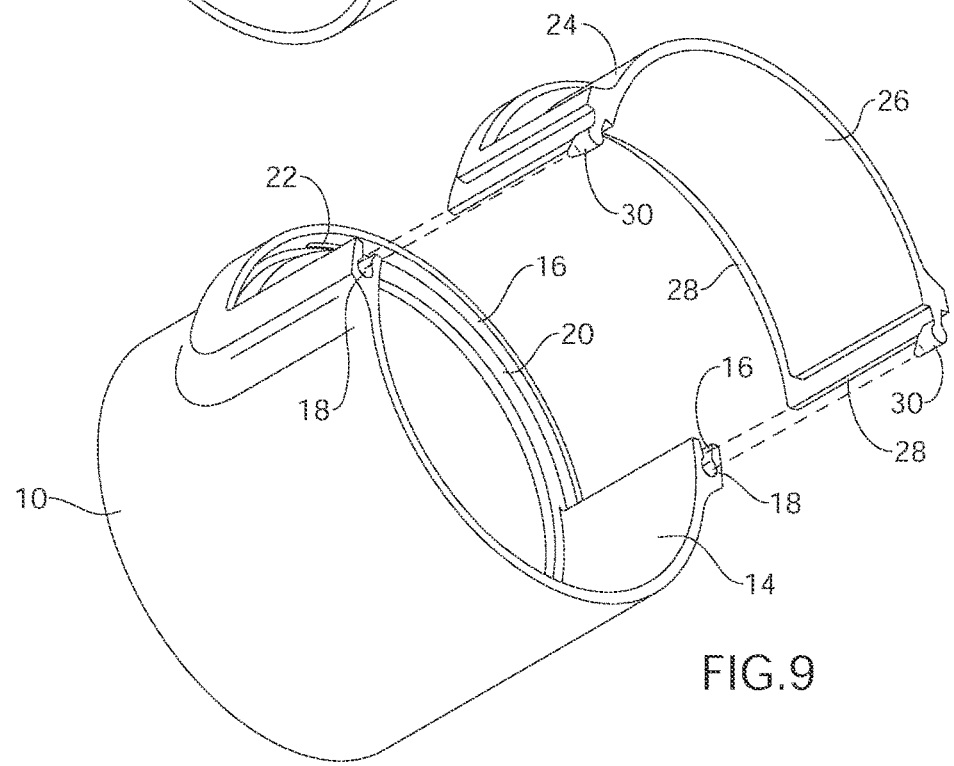
FIG. 9 is a bottom perspective exploded view of an exemplary embodiment of the present invention.
Figure 10A:
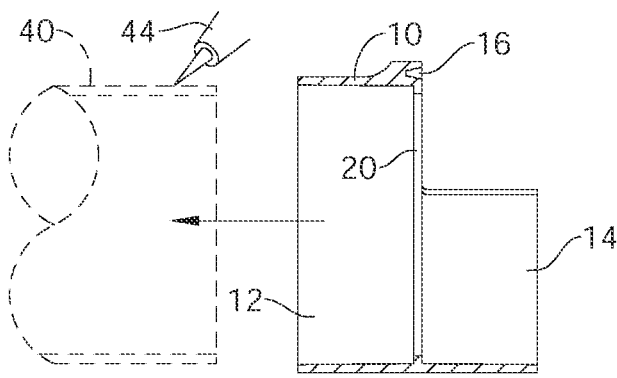
FIG. 10A is a schematic view of an exemplary first step on installation of the present invention.
Figure 10B:
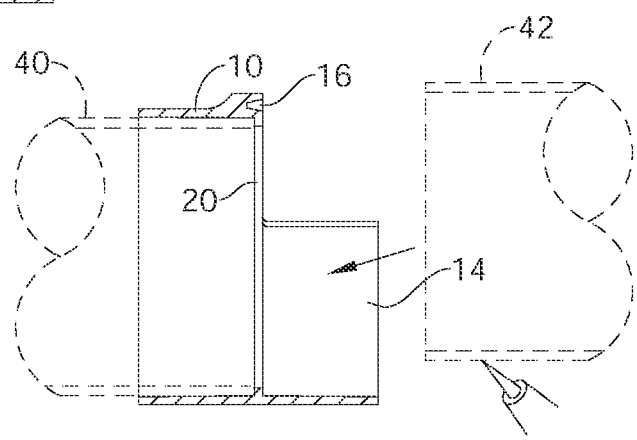
FIG. 10B is a schematic view of an exemplary second step on installation of the present invention.
Figure 10C:
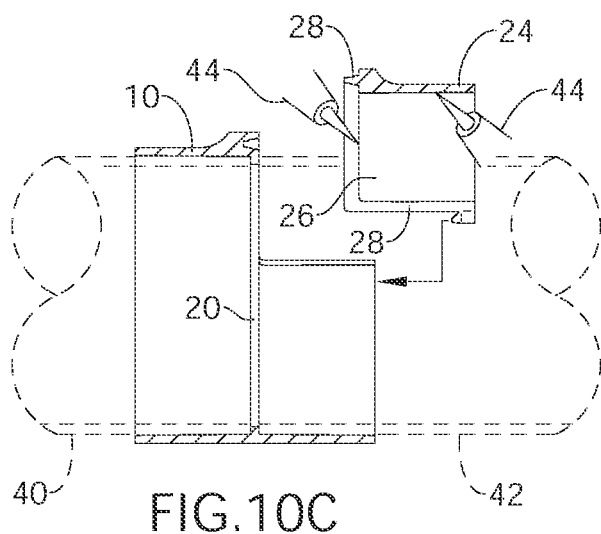
FIG. 10C is a schematic view of an exemplary third step on installation of the present invention.
Figure 10D:
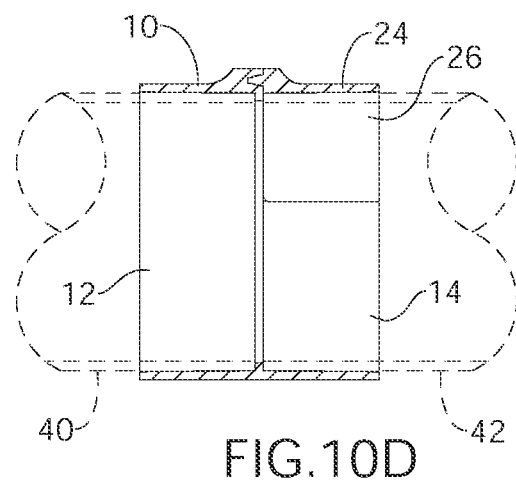
FIG. 10D is a schematic view of an exemplary final step on installation of the present invention.

Referring now to FIGS. 1 through 9, the present invention may include a method, device, and system for coupling two conduits together. The method and system embody a coupling assembly 100 comprising a coupler 10 and a cap 24. The coupler 10 is a hybrid hub that has two different sides, a first side 70 and a second side 80. The first side 70 is defined by a tubular shape having a circular opening dimensioned and adapted to slidably receive a distal end of a first conduit 40. The tubular shape defines flared space 12 whereby the diameter of the tubular shape decreases as the first side 70 extends from its distal end toward the second side 80, as illustrated in FIG. 4. A butt rib 20 is disposed along the inner circumference of the tubular shape. The butt rib 20 is disposed adjacent to the second side 80. Conceptually, the butt rib 20 can be seen as the transition between the first side 70 and the second side. The butt rib 20 acts as a stop against with the first conduit 40 abuts after being slid into the first opening (defined by the flared space 12). Likewise, the butt rib 20 acts as a stop for the second conduit 42 that is received by the coupler 10.

Figure 1:
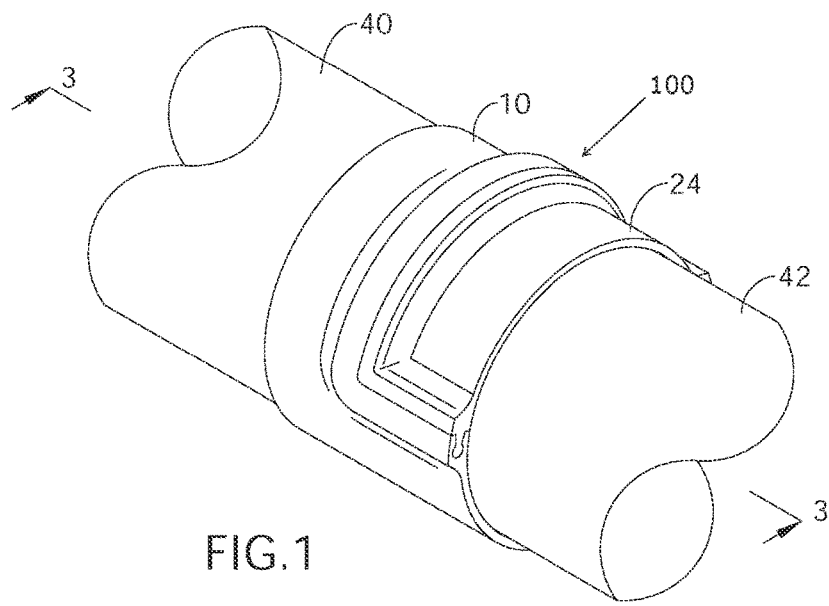
FIG. 1 is a top perspective view of an exemplary embodiment of the present invention, shown in use.
Figure 2:
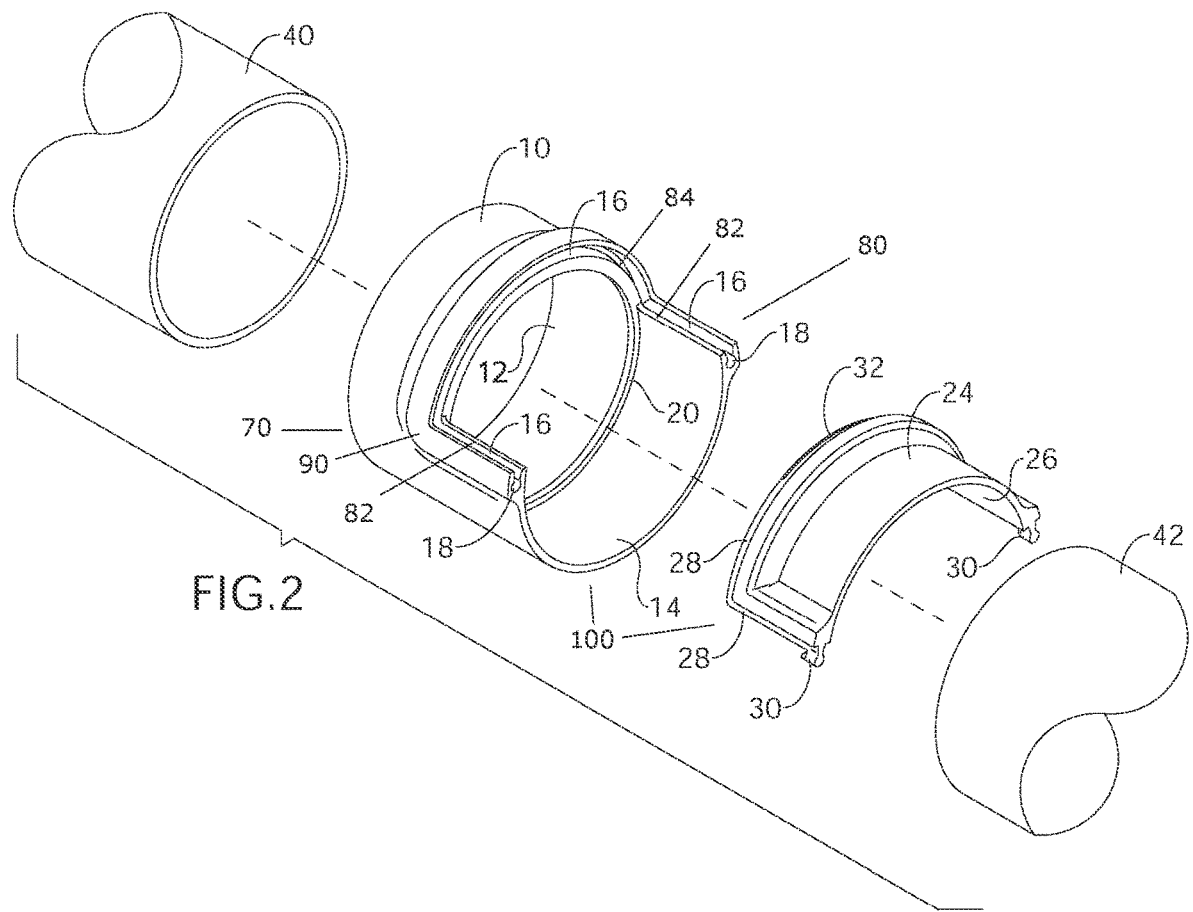
FIG. 2 is an exploded perspective view of an exemplary embodiment of the present invention.
Figure 3:
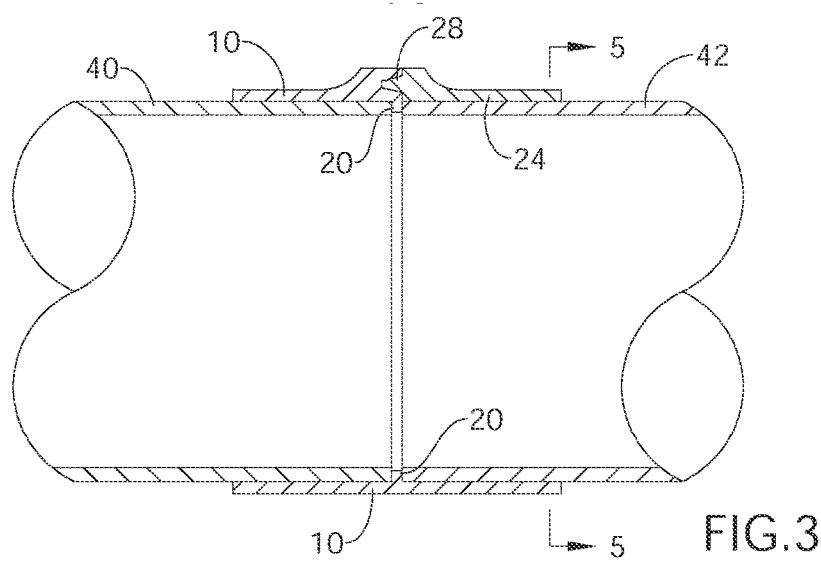
FIG. 3 is a section view of an exemplary embodiment of the present invention, taken along line 3-3 in FIG. 1.

The second side 80 of the coupler 10 is defined, in part, by a circumferential cutout of the sidewall of the otherwise tubular shape. This arcuate cutout is defined by two opposing longitudinal edges 82 and a circumferential edge 84 bridging the two longitudinal edges 82, as shown in FIG. 2. In one embodiment, a flange 90 along the outer circumference of the second side 80 mirrors and is spaced apart from the two longitudinal edges 82 and the circumferential edge 84 thereby defining a glue channel 16 along said edges 82 and 84 (the glue channel 16 being between the flange 90 and the outer circumference of the second side 80). The glue channel 16 may provide a slot 18 at the distal ends of the longitudinal edges 82. The slot 18 may be one-tenth or less in length of that of an associated longitudinal edge 82.

The non-cutout portion of the second side 80 is a partial tubular shape dimensioned and adapted to receive a distal end of a second conduit 42 until it abuts the same butt rib 20. This partial tubular shape may define a second flared space 14 whereby the diameter of the tubular shape decreases as the second side 80 extends from its distal end toward the first side 70.

The cap 24 may be approximately the size and (curved) shape of the arcuate cutout of the second side 80 to substantially occupy the void defined thereby. The cap 24 provides a glue ridge 28 disposed along its longitudinal edges and one circumferential edge. The glue ridge 28 is dimensioned and adapted to slidably mate with the glue channels 16 when the cap 24 occupies the arcuate cutout of the second side 80 of the coupler 10. The glue ridge 82 may terminate (on both its ends) with a nub 30 dimensioned to snugly nest in the slots 18 of the glue channel 16.

A cap protrusion 32 may be provided along an outer surface of the circumferential portion of the glue ridge 28. While a coupler protrusion 22 may be provided along an inner surface of the circumferential portion of the flange 90/glue channel 16. The cap and coupler protrusions 32 and 22 are dimensioned and adapted to operatively associate when the cap 24 and the coupler 10 mate, thereby forming a locked engagement shown in detail in FIG. 7. This locked engagement may generate an audible ('click') sound which informs the installer of satisfactory mating. Mating can also be confirmed through visual confirmation of the cap properly mating with the coupler. Along the distal, arcuate end of the cap 24 (opposite the cap protrusion 32) the arcuate end may define a third flared space 26 whereby the diameter of the tubular shape decreases as the cap 24 extends from its distal end toward the coupler 10, as illustrated in FIG. 4.

Referring the FIGS. 10A through 10D, the coupler 10 may be installed first onto the existing first conduit 40 of the tubing system. Then cap 24 is installed as a secondary step once the coupler 10 is adhered in place. One cannot install the cap 24 until the coupler 10 is installed: it is a multi-step process. First, one adds adhesive 44 to the outer surface of the first conduit 40, and then adheres the coupler 10 thereto so that the distal end of the first conduit 40 abuts the butt rib 20 or is otherwise properly received in the first side 80 of the coupler 10. Then the installer adds adhesive 44 to the outer surface of the second conduit 42 prior to sliding it along the second side 80 until it abuts the butt rib 20. Then the installer adds adhesive 44 to the glue ridge 28 and then slides the cap 24 over the second conduit 42 and until the glue ridge 28 mates with the glue channel 16.

The present invention can be used to repair damage to an existing tubing/pipe section or to modify an existing system (e.g., tie in or expansion). The process for a repair or tie-in is similar. A user would first locate the damaged area or desired area to modify, and then excavate to expose the pipe/tubing. The user would then cut out a segment of the existing system that contains the damage or where they would like to make the tie-in (cuts should be made to coincide with size or pipe to be installed, either repair section or tie in section). The user would then clean the area in preparation for installation (e.g., wipe down the surface) of the repair coupling. The user would then install the adhesive 44 (for instance, PVC glue primer) to the surface of the tubing/pipe. The user would then install the coupler 10 on both ends of the existing pipe system or one end as necessary. The user could then measure the size of the opening between couplings and cut the new pipe to match the opening. The user could then add primer and glue to both the coupling and the pipe and press the pipe into the opening(s) of the coupling(s). The user could then apply glue 44 to and install the cap 24. After the glue is set the installation is complete.

Figure 11:
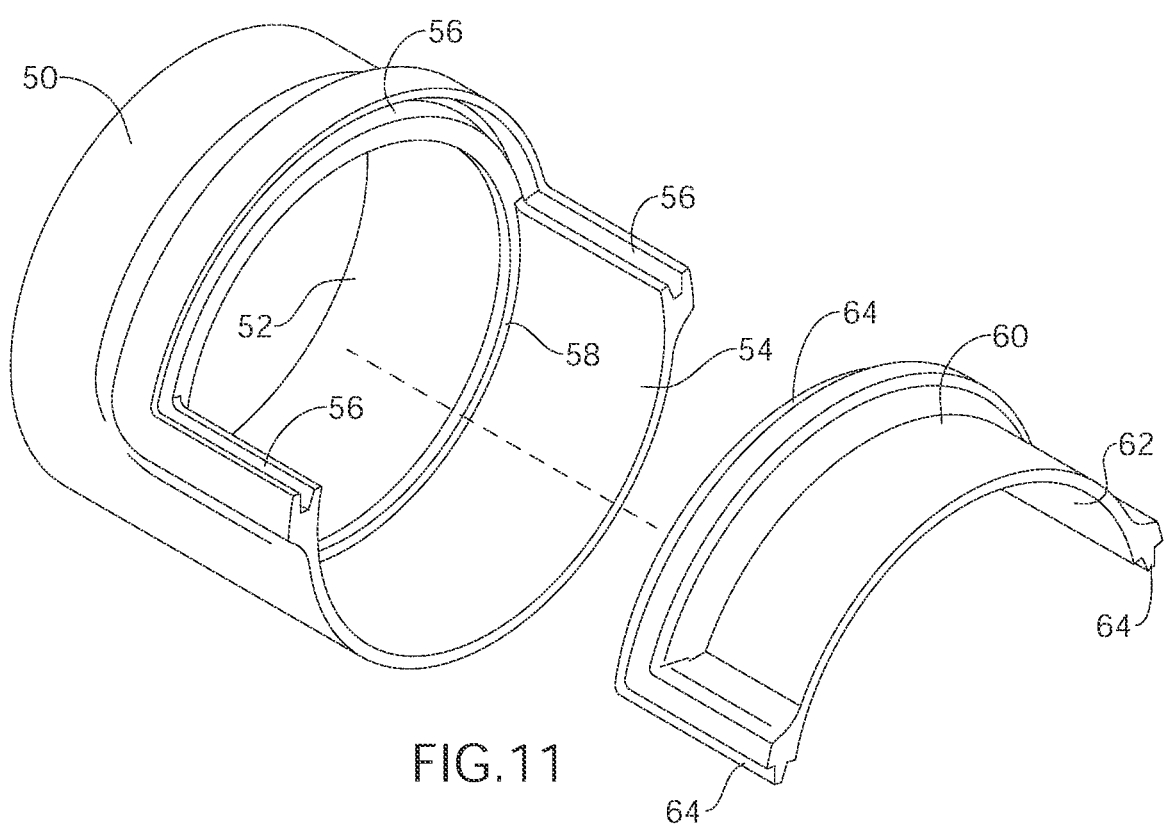
FIG. 11 is a top front perspective exploded view of an exemplary embodiment of the present invention.
Figure 12:
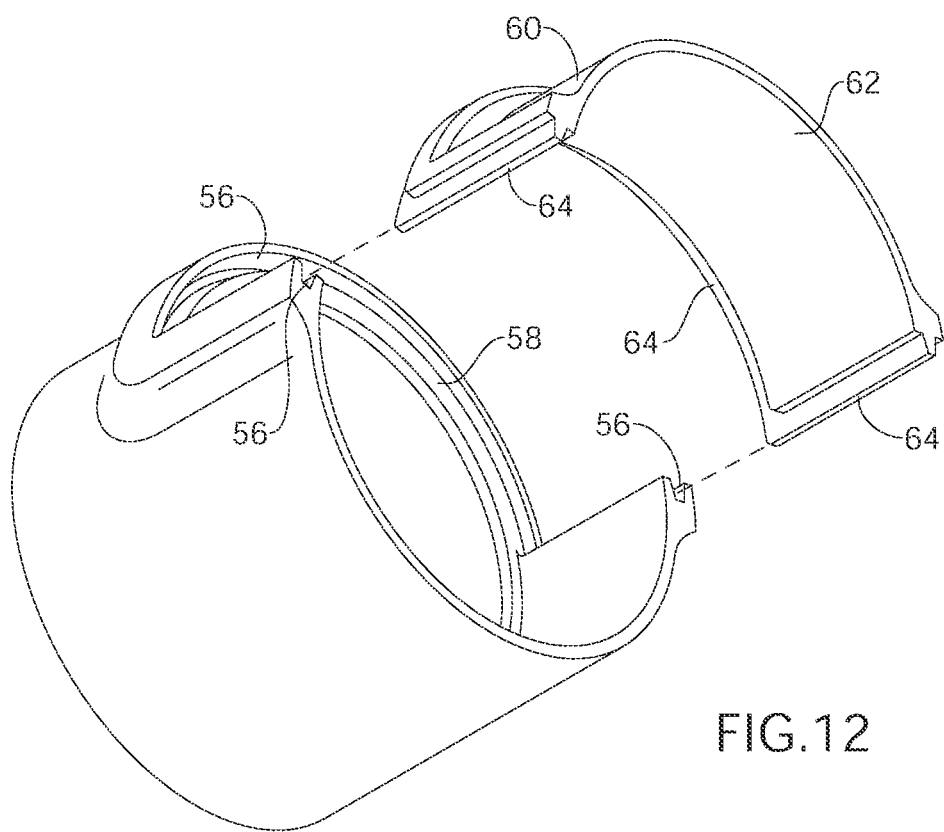
FIG. 12 is a bottom front perspective exploded view of an exemplary embodiment of the present invention.

Referring to FIGS. 11 and 12, the present invention contemplates differently sized and shaped couplers 50, first flare openings 52, glue channels 56, slots, butt ribs 58, caps 60, glue ridges 64, second flare openings 54, third flare openings 62, and the like, as long as the invention functions are disclosed herein.

As used in this application, the term "about" or "approximately" refers to a range of values within plus or minus 10% of the specified number or value. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A conduit coupling device comprising:
   a coupler, comprising:
   a first end and an opposing second end;
   the second end defined by an arcuate cutout; and
   a glue channel provided along a periphery of the arcuate cutout; and
   a cap comprising:
   an arcuate shape approximately coextensive with the arcuate cutout;
   a glue ridge provided along a periphery of the arcuate shape, wherein the glue ridge is dimensioned to slidably be received in the glue channel when the arcuate shape occupies the arcuate cutout; and
   a slot on each end of the glue channel, wherein the slot provides a cross sectional void downward of the glue channel.

2. The conduit coupling device of claim 1, further comprising a nub on each end of the glue ridge, wherein the nub is dimensioned and adapted to be slidably received in the respective slot when the arcuate shape occupies the arcuate cutout.

3. The conduit coupling device of claim 1, wherein the glue channel tapers downward.

4. The conduit coupling device of claim 1, further comprising a butt rib disposed along an inner circumference of the coupler between the first and second ends.

5. The conduit coupling device of claim 1, wherein a first opening defined by the first end has a diameter greater than a diameter of the first end closer to the second end than the first opening.

6. The conduit coupling device of claim 1, wherein a second opening curvature partially defined by the second end has a radius greater than a radius of the second end closer to the first end than the second opening.

7. The conduit coupling device of claim 1, further comprising a cap protrusion disposed along an outer surface of a curved portion of the glue ridge; and a coupler protrusion disposed along an inner surface of the glue channel, wherein when the arcuate shape occupies the arcuate cutout a locked engagement is formed between the cap and coupler protrusions.

8. A method of coupling a first and second conduit, the method comprising:
   providing the conduit coupling device of claim 1;
   adhering the first end to the first conduit;
   adhering the second end to the second conduit; and
   sliding the glue ridge into the glue channel.

9. The method of claim 8, further comprising placing an adhesive in the glue channel prior to sliding the glue ridge therein.

10. A conduit coupling device comprising:
    a coupler, comprising:
    a first end and an opposing second end;
    the second end defined by an arcuate cutout; and
    a glue channel provided along a periphery of the arcuate cutout; and
    a cap comprising:

an arcuate shape approximately coextensive with the arcuate cutout;

a glue ridge provided along a periphery of the arcuate shape, wherein the glue ridge is dimensioned to slidably be received in the glue channel when the arcuate shape occupies the arcuate cutout; and a cap protrusion disposed along an outer surface of a curved portion of the glue ridge; and a coupler protrusion disposed along an inner surface of the glue channel, wherein when the arcuate shape occupies the arcuate cutout a locked engagement is formed between the cap and coupler protrusions.

11. The conduit coupling device of claim 10, further comprising a nub on each end of the glue ridge, wherein the nub is dimensioned and adapted to be slidably received in the respective slot when the arcuate shape occupies the arcuate cutout.

12. The conduit coupling device of claim 10, wherein the glue channel tapers downward.

13. The conduit coupling device of claim 10, further comprising a butt rib disposed along an inner circumference of the coupler between the first and second ends.

14. The conduit coupling device of claim 10, wherein a first opening defined by the first end has a diameter greater than a diameter of the first end closer to the second end than the first opening.

15. The conduit coupling device of claim 10, wherein a second opening curvature partially defined by the second end has a radius greater than a radius of the second end closer to the first end than the second opening.

16. A method of coupling a first and second conduit, the method comprising:
providing the conduit coupling device of claim 10;
adhering the first end to the first conduit;
adhering the second end to the second conduit; and
sliding the glue ridge into the glue channel.

17. The method of claim 16, further comprising placing an adhesive in the glue channel prior to sliding the glue ridge therein.

* * * * *